United States Patent
Shefaat et al.

(10) Patent No.: US 11,218,292 B2
(45) Date of Patent: Jan. 4, 2022

(54) SECURE DATA TRANSMISSION

(71) Applicant: Multitiv GMBH, Berlin (DE)

(72) Inventors: Mohammad Shefaat, Berlin (DE);
Vladimir Beliavski, Munich (DE);
Tatjana Carle, Neubrandenburg (DE)

(73) Assignee: Multitiv GmbH, Berlin (DE)

( * ) Notice: Subject to any disclaimer, the term of this patent is extended or adjusted under 35 U.S.C. 154(b) by 353 days.

(21) Appl. No.: 16/330,129

(22) PCT Filed: Sep. 5, 2017

(86) PCT No.: PCT/EP2017/072201
§ 371 (c)(1),
(2) Date: Mar. 4, 2019

(87) PCT Pub. No.: WO2018/042053
PCT Pub. Date: Mar. 8, 2018

(65) Prior Publication Data
US 2019/0215150 A1 Jul. 11, 2019

(30) Foreign Application Priority Data

Sep. 5, 2016 (EP) ..................................... 16187276

(51) Int. Cl.
*H04L 29/06* (2006.01)
*H04L 9/06* (2006.01)
*H04L 9/08* (2006.01)

(52) U.S. Cl.
CPC ............ *H04L 9/0625* (2013.01); *H04L 9/065* (2013.01); *H04L 9/0631* (2013.01); *H04L 9/0819* (2013.01); *H04L 9/0869* (2013.01)

(58) Field of Classification Search
CPC ... H04L 9/0625; H04L 9/0631; H04L 9/0819; H04L 9/0869; H04L 9/065
See application file for complete search history.

(56) References Cited

U.S. PATENT DOCUMENTS

| 7,003,107 B2 * | 2/2006 | Ananth ................... H04L 9/065 380/29 |
| 8,600,050 B1 | 12/2013 | Ye et al. |

(Continued)

FOREIGN PATENT DOCUMENTS

| CN | 105245743 A | * | 1/2016 | ................ H04B 1/00 |
| EP | 1833009 A1 | * | 9/2007 | ............ H04L 9/0852 |

(Continued)

OTHER PUBLICATIONS

Chakrawarti et al., Implementation of Cryptography based Methods to Prevent Selective Jamming Attacks for True Communication in Wireless Network, International Journal of Technology Research and Managment, ISSN:2348-9006, vol. 2, Issue 8. Paper ID:2015/IJTRM/8/2015/5586.

(Continued)

*Primary Examiner* — John B King
(74) *Attorney, Agent, or Firm* — Forsgren Fisher; James M. Urzedowski; Daniel A. Tysver

(57) ABSTRACT

A method for secure transmission of a data stream between at least one sender and at least one recipient comprises packetizing the data stream into a plurality of data packets of data bits. Each data packet is split into at least two subpackets and the subpackets are encrypted with a one-time pad stored at the sender. The encrypted subpackets are transmitted to the receiver by transmitting one of the two encrypted subpackets over a first transmission path and transmitting another one of the two encrypted subpackets over a second transmission path wherein the first transmission path is different from the second transmission path. At the receiver, the encrypted subpackets are decrypted using an identical copy of the one-time pad stored at the receiver and the information of the data packet is restored from the (Continued)

at least two subpackets. Furthermore, a system for secure transmission is provided.

8 Claims, 1 Drawing Sheet

(56) References Cited

U.S. PATENT DOCUMENTS

| | | | | |
|---|---|---|---|---|
| 8,930,423 | B1* | 1/2015 | Surampudi | G06F 16/188 |
| | | | | 707/821 |
| 2003/0149869 | A1 | 8/2003 | Gleichauf | |
| 2004/0032950 | A1* | 2/2004 | Graunke | H04L 9/065 |
| | | | | 380/42 |
| 2008/0260143 | A1* | 10/2008 | Ibrahim | H04L 9/3013 |
| | | | | 380/28 |
| 2011/0248665 | A1* | 10/2011 | Smith | H04M 1/04 |
| | | | | 320/101 |
| 2011/0280404 | A1* | 11/2011 | Jennas, II | H04L 63/0485 |
| | | | | 380/278 |
| 2012/0076298 | A1* | 3/2012 | Bolotov | H04L 9/0631 |
| | | | | 380/255 |
| 2012/0089829 | A1* | 4/2012 | Kholidy | H04L 67/10 |
| | | | | 713/153 |
| 2012/0224691 | A1* | 9/2012 | Purohit | H04L 9/065 |
| | | | | 380/255 |
| 2013/0117488 | A1* | 5/2013 | Perry | G11B 33/08 |
| | | | | 710/304 |
| 2013/0227286 | A1* | 8/2013 | Brisson | H04L 9/3226 |
| | | | | 713/168 |
| 2014/0208116 | A1* | 7/2014 | Tanizawa | H04L 63/06 |
| | | | | 713/171 |
| 2014/0369498 | A1* | 12/2014 | Hammersmith | H04L 9/0822 |
| | | | | 380/46 |
| 2015/0043730 | A1 | 2/2015 | Thompson | |
| 2016/0119146 | A1* | 4/2016 | Anderson | H04L 9/3242 |
| | | | | 380/30 |
| 2016/0315763 | A1* | 10/2016 | Hammon | H04L 9/0656 |
| 2017/0324553 | A1* | 11/2017 | Ahn | H04L 9/3226 |

FOREIGN PATENT DOCUMENTS

| | | | | |
|---|---|---|---|---|
| EP | 2701337 A2 | * | 2/2014 | H04L 9/085 |
| JP | WO2013014734 A1 | * | 2/2015 | H04L 9/16 |
| JP | 2017092696 A | * | 5/2017 | H04L 9/0877 |
| WO | WO-0011870 A1 | * | 3/2000 | H04N 21/8358 |
| WO | WO-2012031757 A1 | * | 3/2012 | H04L 63/0838 |
| WO | WO-2015157720 A2 | * | 10/2015 | G06K 7/10722 |
| WO | WO-2018089070 A2 | * | 5/2018 | H04L 9/0662 |

OTHER PUBLICATIONS

EP Office Action. Ser#:16187276.7.
European Extended Search Report (App. No. 16187276.6-1870), dated Mar. 8, 2017.
European Office Action (App. No. 16187276.7-1218), dated Dec. 21, 2018.

* cited by examiner

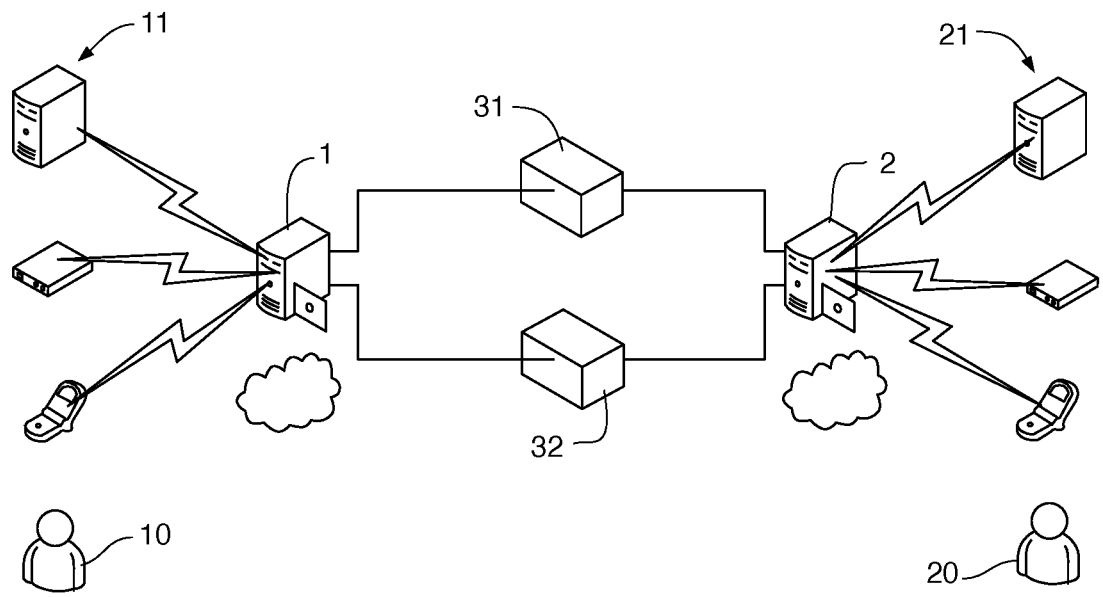

SECURE DATA TRANSMISSION

The present invention relates to a method and a system for securely transmitting data, particularly using encryption of packetized data and multi-channel transmission.

When electronically transmitting data, for example through a computer network, it is generally desirable to protect the transmitted content from being captured and read by an unauthorized third party. This is important for reasons of privacy protection for communications containing sensitive private information, but essential for the transmission of commercial data, such as data relating to e-commerce, communication within companies for protecting business secrets, privileged attorney-client communication, or governmental and military communication.

A wide variety of possibilities to encrypt data communication is available, including symmetric encryption or encryption using public keys, using standards such as the Advanced Encryption Standard (AES) or publicly available applications like Pretty Good Privacy (PGP).

A method for securely storing and transmitting data is described in EP 1 732 259 A1 which discloses generating a random sequence of characters as a key stream as a one-time pad. The keystream is bitwise combined with plaintext using an exclusive-OR operation to create ciphertext. The keystream and ciphertext are routed over physically separate communication paths to a receiving host, which decrypts by applying the keystream to the ciphertext using exclusive-OR.

WO 2012/139174 A1 and EP 2 555 466 A1 relate to the distribution of cryptographic keys and teach using a quantum channel for distributing and synchronizing bits used as one-time pad.

There is still a need to further increase the security of data transmission, and to provide a convenient system that allows encryption at a very high level.

The present invention is defined by the appended independent claims; the dependent claims describe embodiments of the invention.

The transmission method of the present invention allows secure transmission of a data stream between a sender and a recipient, and further allows multi-user transmission between multiple senders to multiple recipients. According to the invention the sender receives a data stream. The data stream may be received by the sender from a user equipment (UE), such as a personal computer, mobile device, or a server distributing, e.g. media content. The transmission between the UE and the sender may be performed in any known way, such as wired or wireless using e.g. LAN, WLAN or mobile communication standards. Alternatively, the UE, e.g. a mobile device, may be configured as the sender to prepare and transmit the data stream. The bit stream to be transmitted is packetized at the sender into a plurality of data packets that may have the same or varying sizes. The packetizing may use already existing packets, such as internet protocol (IP) packets. Alternatively, proprietary packetizing may be performed, such as collecting data into packets up to a predefined size (resulting in packets of equal size) or collecting bits during a predefined time (packets of varying sizes).

Each data packet is split into at least two subpackets. The subpackets are formed such that the information of the underlying data packet can be restored from a combination of the subpackets only, the individual subpackets include unusable information.

Preferably, two subpackets are formed from each data packet. This may be achieved by encrypting the data packet using a random key, preferably a symmetrical key such as used in AES encryption. In this case, the key represents one of the subpackets while the encrypted data represent the other one of the two subpackets. Restoring the original data packet is only possible with both subpackets, by using the key to decrypt the encrypted subpacket.

Alternatively, secret sharing may be used to form the at least two subpackets that again are only useful in combination to restore the original information.

Before being transmitted, a one-time pad is overlaid over the subpackets, and the encrypted subpackets are transmitted to the receiver.

The sender and the receiver are connected at least via two distinct transmission paths. The different paths may use different transmission technologies, such as wireless or wired transmission. The paths may also be locally separated by using, for example, different transmission cables, or may use different frequencies for wireless transmission, and/or may be temporarily separated. Radio transmission may also be used a transmission path. That is, the data transmission may be wireless using for example GSM, UMTS, LTE or via a radio network, or wired using for example DSL.

The sender and the receiver are the components which are installed at the respective user's site, preferably without installation of further IT components, i.e. on a plug & play basis.

The sender and the receiver may be part of a single system, i.e. each user may have a system having a sender and a receiver installed therein. This way each user has sending and receiving capabilities.

Two of the encrypted subpackets formed from an individual data packet are transmitted via different transmission paths. In the preferred case of two subpackets being formed from each data packet, one of the encrypted subpackets is transmitted over a first transmission path and the other one of the two encrypted subpackets is transmitted over a second transmission path from the sender to the receiver.

At the receiver, the encrypted subpackets are decrypted using an identical copy of the one-time pad held by the receiver and the information of the data packets is restored by using the combined information of the subpackets being formed from each data packet.

The invention further provides a system for securely transmitting a data stream. The system comprises at least one sender, at least one recipient, and at least two different transmission paths. The sender and the recipient are configured to perform the transmission method of the invention.

The keys used for splitting the data packets in the embodiment using symmetric encryption may be pregenerated at the sender and stored in a key buffer. Furthermore, the keys are transmitted to the receiver. Also at the receiver, a key buffer is provided for storing the transmitted keys. Later, when data packets should be transmitted, the keys stored in the key buffers at the sender and at the receiver can be used to encrypt and decrypt the data packets without the need of simultaneously transmitting the corresponding keys. Thereby, also in the case a transmission channel used for transmitting the keys is unavailable, e.g. due to transmission problems or an attack to this channel, the encrypted data, i.e. the second subpacket, can be transmitted on another transmission path and the communication can continue uninterrupted.

According to the present invention, all subpackets are additionally overlaid with a one-time pad. This applies to both the key and the encrypted data when using symmetric encryption for splitting the data packets, and also for the different subpackets formed using secret sharing. The random numbers of the one-time pad must be available at the sender, and, in an identical copy, at the receiver. Preferably, the bits of the one-time pad are generated quantum mechanically, using a quantum random number generator (QRNG). A huge amount of random numbers may be pregenerated as one-time pad data and stored in a memory provided at the sender. An identical copy of the one-time pad may be produced and transferred to receiver side. Each time subpackets are to be transmitted, the subpacket may then be overlaid with a portion of the pregenerated one-time pad data. The one-time pad data stored in the memories at the sender and the receiver must be regularly replaced in order to assure that each portion of the one-time pad data is only used once.

For example, two identical copies of quantum mechanically generated random numbers may be centrally produced and transferred to the sender and the receiver. In order to further increase security, the identical copies may be stored on two memory devices, e.g. hard discs, that are shipped and installed to the sender and the receiver. In order to avoid the need to frequently replace the memory devices, devices with sufficient storage space should be used, such as hard drives having disc spaces of 500 GB or more. If the one-time pad data is "consumed" before the memories have been replaced, permutations of the stored random numbers may be used. This, however, leads to a decrease of the level of security that depends on the size of the stored one-time pad data.

According to an embodiment of the invention, a portable or mobile device may be configured as the sender and/or the recipient, e.g. a cell phone, a tablet or a notebook computer. As storage still is an issue for mobile devices, only limited space may be assigned for storing the one-time pad data. In order to regularly update the one-time pad data in a mobile device, the "complete" one-time pad data, identically stored at the sender and the receiver, may be locally stored in a memory at or connected to a docking station, e.g. a docking station that is used to regularly charge the mobile device. Each time the mobile device is connected to the docking station, a portion of the one-time pad data may be transferred to the mobile device for subsequent use.

BRIEF DESCRIPTION OF THE SEVERAL VIEWS OF THE DRAWINGS

The invention will be described in the following with reference to FIG. 1 that schematically shows the configuration of the system according to an embodiment of the invention.

DETAILED DESCRIPTION

As shown in the FIGURE, sender 1 is connected with recipient 2 via two different transmission channels 31 and 32. Sender 1 receives a data stream to be transmitted from a user equipment UE 11 operated by user 10. The UE 11 may be any kind of user equipment including a computer, a media server or a mobile device, connected with sender 1 via a computer network, such as LAN, WLAN or another wireless network. The bits of the data stream are packetized and each data packet is split into at least two subpackets in such a way that all subpackets formed from an individual data packet must be known to be able to restore the information of the underlying data packet. For example, as described above, a random key may be used to encrypt the data packet, resulting in two subpackets, namely the key and the encrypted data packet. Other ways to split a data packet are known, such as secret sharing or secret splitting.

All resulting subpackets are additionally protected using a one-time pad. A one-time pad is a sequence of random numbers having a size equal to the size of the data to be protected. The bits of the one-time pad are superimposed or overlaid, e.g. added, to the data bits. Only the knowledge of the one-time pad allows decrypting the data. If the sequence of random numbers used as one-time pad is a true sequence of random numbers, such as a sequence of random numbers generated using physical phenomena based on the laws of quantum mechanics, the data cannot be decrypted as long as the one-time pad is kept secret. Therefore, according to a preferred embodiment, a huge number of true random numbers may be produced and stored in two identical copies on two storage devices. The two identical devices may then be brought to the sender 1 and the receiver 2, where the stored random numbers are used for protecting the communication.

In order to further protect the communication, the subpackets being formed from an individual data packet must be transferred using different transmission paths. In the case where each data packet is split into two subpackets, for example when using symmetric encryption, one subpacket, for example the key, is transmitted over a first transmission channel 31, and the other subpacket, e.g. the encrypted data, is transferred over the second transmission path. Thereby, even if the data communicated over one of the transmission channels is intercepted, the communication is still safe since having the knowledge of only one of the subpackets is useless by construction, in addition to the one-time pad encryption. The choice of the transmission paths for the subpackets may be random. Alternatively, one of the transmission paths may be dedicated for transmitting the keys while the other one is reserved for the data. If more than two subpackets are formed from one data packet, it must be ensured that at least one of the subpackets formed from one individual data packet is sent via a transmission path that differs from the path used for another one of the subpackets from the same data packet. Also, more than two transmission paths may be provided.

At the recipient 2 the subpackets are decrypted using the copy of the one-time pad held at the recipient side. After decrypting, the content of the original data packet is restored by combining the respective subpackets, and may be transferred to a UE 21 operated by a user 20 on the receiver side. When one of the transmission paths is temporarily unavailable the communication is interrupted since part of the information needed to restore the data packets is missing. When using (symmetric) encryption for splitting the data packets, it is possible to avoid these problems by using key buffering. A number of keys are pregenerated for this purpose. The keys are stored in a memory at the sender 1 and further transmitted to the receiver 2 using one of the transmission channels and stored in a memory at the receiver side. In the case of one transmission path being interrupted, the prepared keys may be used for encrypting the data packets, previously sent via the uninterrupted transmission path, and decrypted at the receiver using the previously transmitted keys.

The invention claimed is:

1. A system for securely transmitting a data stream, comprising:
   at least one sender,
   at least one recipient,
   a mobile device configured as the sender and/or the recipient,
   a random number generator for quantum mechanically generating random numbers to be used as a one-time pad, a docking station configured to transmit a portion of the random numbers from the memory at the sender or the recipient. respectively, when the mobile device is connected to the docking station, a first transmission path, a second transmission path different from the first transmission path, and a memory at the sender for storing the random numbers that have been quantum mechanically generated by the random number generator. and a memory at the recipient for storing an identical copy of the random numbers stored in the memory at the sender wherein the sender is configured to
- packetize the data stream into a plurality of data packets of data bits;
- split each one of the data packets into at least two subpackets;
- encrypt the subpackets with the one-time pad; and
- transmit one subpacket of the encrypted subpackets formed from one of the data packets over the first transmission path and transmit another one of the encrypted subpackets formed from the one of the data packets over the second transmission path;

wherein the recipient is configured to
- decrypt the encrypted subpackets using an identical copy of the one-time pad; and
- restore the information of the data packet from the subpackets formed from the data packet.

2. The system according to claim 1, wherein the sender is further configured to encrypt each data packet using a key for splitting the data packets into the at least two subpackets, wherein the subpackets formed by each data packet comprise the key as one of the subpackets and the encrypted data packet as the other one of the subpackets.

3. The system according to claim 2, wherein further comprising means for generating a plurality of keys, a key buffer for storing the generated keys at the sender and another key buffer for storing the generated keys at the receiver.

4. The system according to claim 1, wherein the sender is further configured to split each data packet using secret sharing.

5. The system according to claim 1, wherein the two transmission paths differ in the way the data is transmitted and/or are locally and/or temporarily separated, wherein the data transmission is wireless.

6. The system according to claim 2, wherein the key is a symmetrical key.

7. The system according to claim 2, wherein the key is an AES key.

8. The system according to claim 1, wherein the two transmission paths differ in the way the data is transmitted and/or are locally and/or temporarily separated, wherein the data transmission is wired.

* * * * *